Patented July 13, 1937

2,086,731

UNITED STATES PATENT OFFICE 2,086,731

RECOVERY OF HYDROCYANIC ACID

Russell W. Millar, Berkeley, and Herbert P. A. Groll, Oakland, Calif., assignors to Shell Development Company, San Francisco, Calif., a corporation of Delaware No Drawing. Application June 28, 1933, Serial No. 678,058

5 Claims. (Cl. 23—151)

This invention relates to the extraction, concentration and recovery of hydrocyanic acid from gaseous or liquid mixtures containing the same.

The general practice of removing a desirable component gas from a crude gaseous mixture comprises: contacting said gaseous mixture in an efficient manner, preferably under pressure, with a liquid solvent for the gas to be removed, and recovering the dissolved gas from the resulting solution by distillation, release of pressure, or by a combination of the two methods. The efficiency of the process or the purity of the obtained product are determined by: the efficiency of the selective dissolving action of the solvent employed on the components of the gas mixture being treated, the chemical inertness of this solvent at the temperature of the process, and the vapor pressure difference of the liquid solvent and gaseous solute at the temperature of the gas recovery operation. The more closely these considerations are observed, the more efficient generally is the operation of the process; the recovered product is less contaminated, and the extent of further treatment is reduced.

It is an object of this invention to provide a class of excellent solvents for hydrocyanic acid which are chemically stable, and have extremely low vapor pressures at the temperatures employed in the process, so that the absorption and recovery of the gas is efficiently accomplished and only a minimum treatment is required to further purify the recovered product.

According to our invention, the hydrocyanic acid is extracted from its admixture with other substances with a solvent of the class of monoglycols, polyglycols, their ethers, esters and mixed ether-esters. The class accordingly comprises certain polyhydric alcohols whose hydroxyl groups may or may not be substituted by ethereal and/or acidyl groups. Subsequently, either the solvent or the hydrocyanic acid may be recovered by heating the solution to expel the gas, or by reducing the pressure over said solution, thereby effecting the separation of the dissolved gas, or by utilizing a combination of both features.

By the term "polyglycols" is designated a class of symmetrical compounds (substituted or not), such as diethylene glycol, dipropylene glycol, dibutylene glycol, triethylene glycol, and the like, as well as asymmetrical compounds (substituted or not), as ethylene propylene glycol, ethylene butylene glycol, propylene butylene glycol, diethylene propylene glycol, diethylene butylene glycol, and the like. The polyglycols suitable for use in this invention may be either of the straight chain type as those just described, or branch-chained type, such as propylene isobutylene glycol, ethylene isobutylene glycol, and the like; it is to be noted that the branched-chain type compounds may be regarded as substituted straight chain compounds in which at least one of the hydrogen atoms in the straight carbon chain has been substituted by an organic radical. The substitution of the hydrogen atoms in the straight carbon chain is not to be limited to alkyl groups, as other univalent groups of the hydroxyl type, etc., may be present in some cases in place of the hydrogen atoms. Corresponding substitution products may be utilized amongst the forked-chain compounds.

"Polyglycol compounds", besides the polyglycols proper, which have just been described, are to include for the purposes of this invention the ethers, (primary, secondary or tertiary, normal or iso-), esters (of aryl, alkyl or aralkyl acids), and mixed ether-esters of polyglycols, as the solvents for hydrocyanic acid. Of this group may be mentioned: diethylene glycol monomethyl ether, diethylene glycol monoethyl ether, diethylene glycol monopropyl ether, diethylene glycol monobutyl ether, diethylene glycol dimethyl ether, diethylene glycol diethyl ether, diethylene glycol dipropyl ether, diethylene glycol dibutyl ether, diethylene glycol mono-isopropyl ether, diethylene glycol mono-tertiary butyl ether, diethylene glycol mono- or di-lactate, diethylene glycol mono- or di-benzoate, diethylene glycol mono- or di-maleate, diethylene glycol mono- or di-oxalate, diethylene glycol mono-ethyl ether formate, diethylene glycol mono-isopropyl ether benzoate, diethylene glycol mono-tertiary butyl ether acetate, diethylene glycol monophenyl ether acetate, diethylene glycol mono-ethyl ether acetate, diethylene glycol monoacetate, diethylene glycol diacetate, diethylene glycol monopropyl ether acetate, and diethylene glycol monobutyl ether acetate.

The corresponding glycol compounds (including corresponding glycerol derivatives) are suitable also, such as ethylene glycol, propylene glycol and their homologues, glycol monoformate, glycol mono- and di-alkyl ethers, esters of the monoalkyl ethers of glycol, glycerol mono- and di-acetate, mono, di- and tri-alkyl ethers of glycerol, esters of the mono-alkyl or di-alkyl ethers of glycerol, ethylene glycol monoethyl ether, ethylene glycol monoethyl ether acetate, etc. Also suitable aliphatic polyhydric derivatives are those of cyclic structure as cyclic ethers and oxides, such as dioxane, glycidol, glycidol ethers and esters, their homologues, and the like.

As a general rule, the absorptive power of the solvents for the hydrocyanic acid depends on the presence of certain oxygen groups in the molecular composition of the solvent; the greater the number of these groups the more readily is hydrocyanic acid dissolved by the solvent. Of the groups thus determining the solving properties of the above enumerated compounds, the following ones have been noted: the ether group

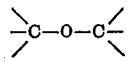

the carbonyl group =C=O, the oxo group

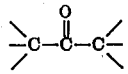

and the ester group

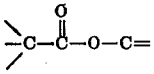

(which can be considered as a combination of the oxo and ether groups). Of the solvents with the same oxygen grouping in their molecules, the one having the smallest organo groupings attached thereto possesses the greatest absorptive capacity towards hydrocyanic acid, which capacity progressively diminishes as these groups increase in molecular weight.

The source of the hydrocyanic acid mixture is not of importance, the acid mixture being obtained from formamide, ammonia and carbon monoxide, hydrocarbons and ammonia, hydrocarbons and nitric oxide, etc.

In carrying out our invention, preferably gases containing hydrocyanic acid are brought into contact in any desired manner, at a suitable temperature, with one or more of these solvents at atmospheric or superatmospheric pressure. The hydrocyanic acid is absorbed and may be recovered by heating and/or reducing the pressure on the solvent; the latter may be recirculated as in a continuous process. However, liquid phase extraction can be resorted to if desired.

The hydrocyanic acid mixture can also be dissolved under pressure in a porous mass, wetted with one or more of the described solvents.

By way of illustration only, the following comparative results were noted. Gas containing 6% HCN was passed through two lamp sulfur absorbers, each of which contained 5 cc. of solvent. After an hour, the contents of both absorbers were analyzed for hydrocyanic acid. The solubility at room temperature and a partial pressure at 0.06 atm. was

|  | gm. HCN/c. c. |
|---|---|
| Diethylene glycol monoethyl ether | 0.051 |
| Ethylene glycol monoethyl ether | 0.041 |
| Ethylene glycol monoethyl ether acetate | 0.024 |
| Ethylene glycol | 0.020 |

The gas was scrubbed countercurrently with these solvents under similar conditions. The degree of removal of HCN is dependent on the character of the solvent, on the number of treatments, on the quantity of solvent, on the temperature and pressure of operation, etc. However, it was noted that the polyglycol compounds were more efficient than the corresponding monoglycol derivatives and that monoglycols were not as efficient as their esters, ethers and mixed ether-esters.

The scrubbing can take place in a tower containing packing, plates or the like. The solvent can be removed at the base of the tower with a predetermined HCN content varying from a state of saturation downwards, dependent on the whim of the operator. A practical range is a solvent saturated 50 to 100% with HCN. The solvent can be recirculated until the desired saturation point is reached and then taken to a stripping column for the recovery of HCN and/or solvent. The solvent is then recycled. Alternatively, only part of the solvent can be sent to the stripping column while a predetermined portion is continuously recycled in the scrubbing tower with fresh solvent.

The process can be carried out continuously, intermittently or in batch fashion.

Solutions of hydrocyanic acid in one or more of the above solvents may be used for the storage of hydrocyanic acid—which will polymerize less readily in such solution than in the pure state. Or reactions of hydrocyanic acid, such as condensation reactions with aldehydes, ketones, oxides, etc. in solvent solution, may be carried out. These reactions are more easily controlled when carried out in an inert solvent. The absorbent as diluting solvent offers advantages in avoiding the step of distilling the absorbed hydrocyanic acid from the absorption liquid.

In certain cases, the above-enumerated class of solvents may be utilized to remove the common acidic components such as $H_2S$, $SO_2$, $CO_2$, $CO$ and the like, from industrial or natural gas mixtures containing the same. In other words, the process offers means for recovering acidic gases in an inert solvent without having to use chemical regeneration methods or without having to use aqueous solutions which might lead to plant corrosion.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process of removing hydrocyanic acid from gaseous mixtures containing the same which includes the step of scrubbing said mixtures with an ester, normally liquid at ordinary temperatures, of a polyhydric alcohol in no molecule of which are there more than three directly linked carbon atoms which are devoid of oxygen atoms.

2. A process of removing hydrocyanic acid from mixtures containing the same which includes the step of extracting said mixtures with an ester, normally liquid at ordinary temperatures, of a polyhydric alcohol in whose molecule there are not more than three directly linked carbon atoms which are devoid of oxygen atoms.

3. As a composition of matter: hydrocyanic acid dissolved in an ester, normally liquid at ordinary temperatures, of a polyhydric alcohol in whose molecule there are not more than three directly linked carbon atoms which are devoid of oxygen atoms.

4. A process of removing hydrocyanic acid from fluid mixtures containing the same via absorption which includes the step of extracting said mixtures with an ester, normally liquid at ordinary temperatures, of a dihydric alcohol in whose molecule there are not more than three directly linked carbon atoms which are devoid of oxygen atoms.

5. As a composition of matter: hydrocyanic acid dissolved in an ester, normally liquid at ordinary temperatures of a dihydric alcohol in whose molecule there are not more than three directly linked carbon atoms which are devoid of oxygen atoms.

RUSSELL W. MILLAR.
HERBERT P. A. GROLL.